(12) United States Patent
Wu et al.

(10) Patent No.: US 7,349,151 B2
(45) Date of Patent: Mar. 25, 2008

(54) IR ABSORBING REFLECTOR

(75) Inventors: Kuohua Wu, Tucson, AZ (US); Anurag Gupta, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 133 days.

(21) Appl. No.: 11/179,117

(22) Filed: Jul. 12, 2005

(65) Prior Publication Data

US 2007/0013998 A1    Jan. 18, 2007

(51) Int. Cl.
*F21V 9/04*    (2006.01)
*G02B 5/08*    (2006.01)

(52) U.S. Cl. .................. 359/359; 359/350; 359/586; 359/588

(58) Field of Classification Search ........ 359/350–361, 359/577–590
See application file for complete search history.

(56) References Cited

U.S. PATENT DOCUMENTS

| | | | |
|---|---|---|---|
| 2,914,989 A * | 12/1959 | Gretener ................... 359/360 |
| 3,944,320 A | 3/1976 | McLintic .................. 359/360 |
| 4,838,629 A * | 6/1989 | Maruyama et al. ........ 359/359 |
| 5,143,445 A * | 9/1992 | Bateman et al. ............ 362/293 |
| 5,169,228 A | 12/1992 | Breitzler .................... 362/293 |
| 5,177,396 A | 1/1993 | Gielen ........................ 313/113 |
| 5,255,029 A | 10/1993 | Vogeley et al. ............. 353/122 |
| 5,257,140 A * | 10/1993 | Rogers ....................... 359/884 |
| 5,274,661 A * | 12/1993 | von Gunten et al. ........ 372/99 |
| 5,339,198 A | 8/1994 | Wheatly et al. ............ 359/359 |
| 5,367,444 A | 11/1994 | Bornhorst et al. .......... 362/264 |
| 5,552,927 A | 9/1996 | Wheatly et al. ............ 359/359 |
| 5,867,329 A | 2/1999 | Justus et al. ................ 359/861 |
| 6,212,004 B1 | 4/2001 | Stachowiak et al. ........ 359/360 |
| 6,262,830 B1 | 7/2001 | Scalora ....................... 359/248 |
| 6,356,020 B1 * | 3/2002 | Cottaar ....................... 313/635 |
| 6,809,859 B2 | 10/2004 | Erdogan et al. ............ 359/359 |
| 2003/0008627 A1 | 1/2003 | Efron et al. ................. 455/143 |

FOREIGN PATENT DOCUMENTS

| | | |
|---|---|---|
| DE | 89 06 325 U1 | 11/1989 |
| WO | WO 94/09392 A | 4/1994 |
| WO | WO 2006/039035 A | 4/2006 |

* cited by examiner

Primary Examiner—Thong Q Nguyen

(57) ABSTRACT

An infrared (IR) light absorbing reflector is formed with a substrate that supports a first IR absorptive multilayer part having multiple layers of partial IR absorbing thin films. The first IR absorptive multi-layer part supports a second visible light reflecting multilayer part.

10 Claims, 5 Drawing Sheets

Design: TiO2_SiO2_25 layers_Ti_coupling_mod5
Reference Wavelength (um): 475
Incident Angle (deg): 0

| Layer | Material | Packing Density | Refractive Index | Extinction Coefficient | Physical Thickness (nm) |
|---|---|---|---|---|---|
| Medium | Air | | 1 | 0 | |
| 1 | TiO2_HP_center | 1 | 2.51953 | 0.00004 | 49.47 |
| 2 | SiO2_center_HP | 1 | 1.47188 | 0 | 79.99 |
| 3 | TiO2_HP_center | 1 | 2.51953 | 0.00004 | 48.55 |
| 4 | SiO2_center_HP | 1 | 1.47188 | 0 | 80.23 |
| 5 | TiO2_HP_center | 1 | 2.51953 | 0.00004 | 44.53 |
| 6 | SiO2_center_HP | 1 | 1.47188 | 0 | 80.23 |
| 7 | TiO2_HP_center | 1 | 2.51953 | 0.00004 | 44.53 |
| 8 | SiO2_center_HP | 1 | 1.47188 | 0 | 80.23 |
| 9 | TiO2_HP_center | 1 | 2.51953 | 0.00004 | 44.53 |
| 10 | SiO2_center_HP | 1 | 1.47188 | 0 | 80.23 |
| 11 | TiO2_HP_center | 1 | 2.51953 | 0.00004 | 44.53 |
| 12 | SiO2_center_HP | 1 | 1.47188 | 0 | 96.28 |
| 13 | TiO2_HP_center | 1 | 2.51953 | 0.00004 | 62.35 |
| 14 | SiO2_center_HP | 1 | 1.47188 | 0 | 112.32 |
| 15 | TiO2_HP_center | 1 | 2.51953 | 0.00004 | 62.35 |
| 16 | SiO2_center_HP | 1 | 1.47188 | 0 | 112.32 |
| 17 | TiO2_HP_center | 1 | 2.51953 | 0.00004 | 62.35 |
| 18 | SiO2_center_HP | 1 | 1.47188 | 0 | 112.32 |
| 19 | TiO2_HP_center | 1 | 2.51953 | 0.00004 | 62.35 |
| 20 | SiO2_center_HP | 1 | 1.47188 | 0 | 112.32 |
| 21 | TiO2_HP_center | 1 | 2.51953 | 0.00004 | 62.35 |
| 22 | SiO2_center_HP | 1 | 1.47188 | 0 | 112.32 |
| 23 | TiO2_HP_center | 1 | 2.51953 | 0.00004 | 46.96 |
| 24 | SiO2_center_HP | 1 | 1.47188 | 0 | 133.62 |
| 25 | TiO2_HP_center | 1 | 2.51953 | 0.00004 | 19.6 |
| 26 | Ti | 1 | 1.74585 | 2.33468 | 9.38 |
| 27 | SiO2_center_HP | 1 | 1.47188 | 0 | 193.59 |
| 28 | Ti | 1 | 1.74585 | 2.33468 | 18.59 |
| 29 | SiO2_center_HP | 1 | 1.47188 | 0 | 356.34 |
| 30 | Ti | 1 | 1.74585 | 2.33468 | 27.58 |
| 31 | SiO2_center_HP | 1 | 1.47188 | 0 | 356.34 |
| 32 | Ti | 1 | 1.74585 | 2.33468 | 67.9 |
| 33 | SiO2_center_HP | 1 | 1.47188 | 0 | 356.34 |
| Substrate | Al | | 1.5233 | 0 | |
| Total Thickness | | | | | 3232.93 |

FIG. 2

Design: TiO2_SiO2_25 layers_Ni_coupling_mod2
Reference Wavelength (um): 510
Incident Angle (deg): 0

| Layer | Material | Refractive Index | Extinction Coefficient | Physical Thickness (nm) |
|---|---|---|---|---|
| Medium | Air | 1 | 0 | |
| 1 | TiO2_top_HP | 2.48278 | 0.00002 | 50.86 |
| 2 | SiO2_top_HP | 1.47118 | 0 | 78.71 |
| 3 | TiO2_top_HP | 2.48278 | 0.00002 | 49.92 |
| 4 | SiO2_top_HP | 1.47118 | 0 | 78.94 |
| 5 | TiO2_top_HP | 2.48278 | 0.00002 | 45.78 |
| 6 | SiO2_top_HP | 1.47118 | 0 | 78.94 |
| 7 | TiO2_top_HP | 2.48278 | 0.00002 | 45.78 |
| 8 | SiO2_top_HP | 1.47118 | 0 | 78.94 |
| 9 | TiO2_top_HP | 2.48278 | 0.00002 | 45.78 |
| 10 | SiO2_top_HP | 1.47118 | 0 | 78.94 |
| 11 | TiO2_top_HP | 2.48278 | 0.00002 | 45.78 |
| 12 | SiO2_top_HP | 1.47118 | 0 | 94.72 |
| 13 | TiO2_top_HP | 2.48278 | 0.00002 | 64.1 |
| 14 | SiO2_top_HP | 1.47118 | 0 | 110.51 |
| 15 | TiO2_top_HP | 2.48278 | 0.00002 | 64.1 |
| 16 | SiO2_top_HP | 1.47118 | 0 | 110.51 |
| 17 | TiO2_top_HP | 2.48278 | 0.00002 | 64.1 |
| 18 | SiO2_top_HP | 1.47118 | 0 | 110.51 |
| 19 | TiO2_top_HP | 2.48278 | 0.00002 | 64.1 |
| 20 | SiO2_top_HP | 1.47118 | 0 | 110.51 |
| 21 | TiO2_top_HP | 2.48278 | 0.00002 | 64.1 |
| 22 | SiO2_top_HP | 1.47118 | 0 | 110.51 |
| 23 | TiO2_top_HP | 2.48278 | 0.00002 | 48.27 |
| 24 | SiO2_top_HP | 1.47118 | 0 | 131.46 |
| 25 | TiO2_top_HP | 2.48278 | 0.00002 | 20.15 |
| 26 | Ni | 1.69669 | 3.01888 | 3.3 |
| 27 | SiO2 | 1.4618 | 0 | 716.05 |
| 28 | Ni | 1.69669 | 3.01888 | 4.8 |
| 29 | SiO2 | 1.4618 | 0 | 500 |
| 30 | Ni | 1.69669 | 3.01888 | 6.91 |
| 31 | SiO2 | 1.4618 | 0 | 535.59 |
| 32 | Ni | 1.69669 | 3.01888 | 8.69 |
| 33 | SiO2 | 1.4618 | 0 | 452.38 |
| 34 | Ni | 1.69669 | 3.01888 | 30 |
| Substrate | Al | 0.80282 | 6.19855 | |
| Total Thickness | | | | 4103.73 |

FIG. 3

Design: TiO2_SiO2_25 layers_W_Cr2O3_couple_mod4
Reference Wavelength (um): 510nm
Incident Angle (deg): 0

| Layer | Material | Refractive Index | Extinction Coefficient | Physical Thickness (nm) |
|---|---|---|---|---|
| Medium | Air | 1 | 0 | |
| 1 | TiO2_top_HP | 2.48278 | 0.00002 | 50.86 |
| 2 | SiO2_top_HP | 1.47118 | 0 | 78.71 |
| 3 | TiO2_top_HP | 2.48278 | 0.00002 | 49.92 |
| 4 | SiO2_top_HP | 1.47118 | 0 | 78.94 |
| 5 | TiO2_top_HP | 2.48278 | 0.00002 | 45.78 |
| 6 | SiO2_top_HP | 1.47118 | 0 | 78.94 |
| 7 | TiO2_top_HP | 2.48278 | 0.00002 | 45.78 |
| 8 | SiO2_top_HP | 1.47118 | 0 | 78.94 |
| 9 | TiO2_top_HP | 2.48278 | 0.00002 | 45.78 |
| 10 | SiO2_top_HP | 1.47118 | 0 | 78.94 |
| 11 | TiO2_top_HP | 2.48278 | 0.00002 | 45.78 |
| 12 | SiO2_top_HP | 1.47118 | 0 | 94.72 |
| 13 | TiO2_top_HP | 2.48278 | 0.00002 | 64.1 |
| 14 | SiO2_top_HP | 1.47118 | 0 | 110.51 |
| 15 | TiO2_top_HP | 2.48278 | 0.00002 | 64.1 |
| 16 | SiO2_top_HP | 1.47118 | 0 | 110.51 |
| 17 | TiO2_top_HP | 2.48278 | 0.00002 | 64.1 |
| 18 | SiO2_top_HP | 1.47118 | 0 | 110.51 |
| 19 | TiO2_top_HP | 2.48278 | 0.00002 | 64.1 |
| 20 | SiO2_top_HP | 1.47118 | 0 | 110.51 |
| 21 | TiO2_top_HP | 2.48278 | 0.00002 | 64.1 |
| 22 | SiO2_top_HP | 1.47118 | 0 | 110.51 |
| 23 | TiO2_top_HP | 2.48278 | 0.00002 | 48.27 |
| 24 | SiO2_top_HP | 1.47118 | 0 | 131.46 |
| 25 | TiO2_top_HP | 2.48278 | 0.00002 | 382.5 |
| 26 | W | 3.43415 | 2.7114 | 10.2 |
| 27 | Cr2O3(ir) | 2.242 | 0.07 | 382.5 |
| 28 | W | 3.43415 | 2.7114 | 10.2 |
| 29 | Cr2O3(ir) | 2.242 | 0.07 | 382.5 |
| 30 | W | 3.43415 | 2.7114 | 13.08 |
| 31 | Cr2O3(ir) | 2.242 | 0.07 | 382.5 |
| 32 | W | 3.43415 | 2.7114 | 10.94 |
| 33 | Cr2O3(ir) | 2.242 | 0.07 | 382.5 |
| 34 | W | 3.43415 | 2.7114 | 17.36 |
| 35 | Cr2O3(ir) | 2.242 | 0.07 | 382.5 |
| Substrate | Al | 0.80282 | 6.19855 | |
| Total Thickness | | | | 4182.65 |

FIG. 4

IR ABSORBING REFLECTOR

BACKGROUND

Optical systems for medical, theatrical, educational and other purposes involve the projection of high intensity light beams. One problem often arises in eliminating harmful effects of infra-red radiation. Use has been made of mirrors, known as cold-light mirrors, whose reflectance is restricted to limited wavelength bands. These produce the required intensity of light in the reflected beam.

Many different types of cold-light mirrors have been produced. Some utilize all polymer construction. Others form multiple dielectric layers on a glass substrate. One such device involves the use of a pigmented vitreous layer formed on a metal substrate in combination with multiple layers of quarter wavelength having alternating high and low indices. A decoupling layer may also be required between the pigmented layer and the multiple layers. Prior cold-light mirrors suffer from poor heat management capabilities, or difficulty in manufacture due to the inability to form different types of layers in a single processing machine.

BRIEF DESCRIPTION OF THE DRAWINGS

FIG. 2 is a table identifying layers of the cold-light reflector of FIG. 1 according to an example embodiment.

FIG. 3 is a table identifying alternative layers of the cold-light reflector of FIG. 1 according to an example embodiment.

FIG. 4 is a table identifying further alternative layers of the cold-light reflector of FIG. 1 according to an example embodiment.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limiting sense, and the scope of the present invention is defined by the appended claims.

Figure 1:
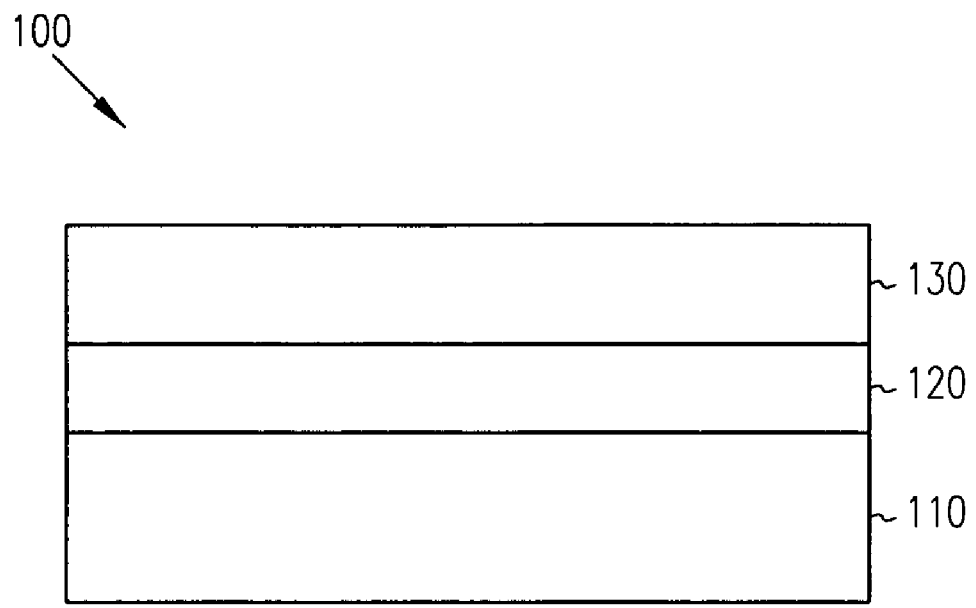
FIG. 1 is a block diagram of a cold-light reflector constructed according to an example embodiment.

FIG. 1 illustrates a cold-light IR absorbing reflector generally at 100. The reflector is formed on a substrate 110 in one embodiment. The reflector may be designed to bandpass visible light or to reflect non-IR light. Substrate 110 may be formed of any material compatible with fabrication methods used to form IR absorbing reflector 100. In one embodiment, substrate 110 is metallic, and may be formed of Al, or most other materials compatible with fabrication methods used to form the IR absorbing reflector 100. A Multi-layer QWT (Quarter Wavelength Thickness) is a general term for optical thin film stack. The actual thickness of multi-layer does not have to be exactly ¼ of wavelength. In general, the thickness of each layer may vary from ¼ wavelength to 1 wavelength. A Multi-layer QWT stack is formed on the substrate in two parts, bottom part 120 and upper part 130. A first IR (infrared) absorptive multi-layer part 120 is formed and supported by the substrate. In one embodiment, part 120 comprises a bottom part of the multi-layer QWT stack and has IR absorptive index and thickness matched layers. The IR absorptive matching layers comprise multiple layers of dielectric, metal, or semi-metal thin film materials, where in general the differences in indices of refraction (hereafter "indices" for brevity) of the layers are selected to be small to minimize reflections. The IR absorptive matching layers in one embodiment use IR materials (i.e., W, Ni, Ti, Ta, Si, $Al_2O_3$, $Cr_2O_3$, and $SiO_2$). The IR absorptive matching layers provide low reflectance for most of the IR region (1 µm~20 µm).

The reflectance of IR in this layer may be reduced by selecting differential indices of adjacent layers to be small. This is referred to as index matching. Further reduction of the reflectance of this layer can be obtained by alternating the thickness of each layer. In one embodiment, layer thicknesses may be determined by computer simulation, optimizing each layer to obtain desired properties, such as absorption of particular wavelengths of IR to obtain an overall absorption that is substantially uniform from the near IR to the far IR.

The term QWT encompasses thicknesses that are generally one quarter of the wavelength of visible light. Thicknesses may be varied to provide different desired properties, and generally range down to one third of the wavelength of visible light. Common thicknesses of the layers are shown in the examples of FIGS. 2, 3 and 4. Other thicknesses may also be used to obtain desired characteristics of reflection of visible light and absorption of radiation outside the desired visible light range.

The upper multi-layer QWT part 130 may include some dielectric thin film materials (i.e., $TiO_2$, $SiO_2$, $Ta_2O_3$, $Al_2O_3$, $Nb_2O_5$, $HfO_x$ and $ZrO_2$). The dielectric layers include alternate relative high and low index material. Part 130 has alternating layers with large differential indices. In one embodiment, the high index material is as high as possible and the low index material is as low as possible. The contrast in indices between alternating layers may maximize reflections in the visible band of light, while minimizing reflections in non-visible bands of light. Part 130 of the QWT layers provides a high reflectance (greater than 95%) for visible radiation (400 nm~800 nm) and absorbs UV (ultra-violet) radiation. Thicknesses may be determined via an iterative computer simulation that is provided a target reflectivity. $TiO_2$, as a layer in either of the parts provides absorption of UV.

In one embodiment, the layers of the stack comprise multi-layers of dielectric, semi-metal, and metal quarter wavelength thin film to direct coat on the top of metal substrate. An absorption layer, such as a pigmented vitreous layer is not needed. This allows the optical thin film layers to be formed using a single coating process, such as physical vapor deposition (PVD) or chemical vapor deposition (CVD) in a single coating machine, which may reduce the complexity of manufacturing. The use of semi-metal and metal thin films in part 120 of the stack can provide coefficient of thermal expansion (CTE) matching between the dielectric bandpass reflective layers, part 130, and the metal substrate 110. The IR absorptive matching layers 120 may in effect act as a thermal expansion absorber.

In a further embodiment, a suitable thin adhesion layer 112 may be formed between part 120 and part 110. Such an adhesion layer 112 may also perform some amount of IR and/or UV non-visible light or incident visible light absorption and also provide for better adhesion of the dielectric layers to a metal surface.

FIG. 2 is a table identifying layers of the cold-light reflector of FIG. 1 according to an example embodiment. In this embodiment, the first twenty-five layers, corresponding to the bandpass reflective layers in part 130, are alternating layers of $TiO_2$ and $SiO_2$. In various embodiments, approximately 20 to 40 of such layers may be used. The $TiO_2$ layers have a refractive index of 2.5 in one embodiment, and a physical thickness of between approximately 19 nm and approximately 63 nm. The $TiO_2$ layers also have an extinction coefficient of approximately 0.00004, which refers to the fraction of light lost to scattering and absorption per unit distance, expressed as a fraction per meter. The example embodiments shown in the Figures may specify refractive indices, thicknesses and extinction coefficients to a fairly high degree of resolution. It should be understood that these represent precise embodiment examples, and that the values may vary significantly from the examples in further embodiments, while still providing desired properties of reflecting varying amounts of visible light and absorbing different amounts of UV and IR light.

The $SiO_2$ layers have refractive index of approximately 1.47 at visible region, and vary between approximately 79 and 134 nm in thickness, The number of alternating layers in part 130 may be varied in different embodiments to provide different reflective characteristics.

Eight layers of alternating Ti and $SiO_2$ are used to form the IR absorbing layers of part 120. The refractive indices are 1.7 and 1.5 respectively at a wavelength of approximately 510 nm corresponding to an approximate middle of the visible spectrum. This provides a sufficient match to minimize reflectance of the IR. The thicknesses range from approximately 9 to 68 nm for the Ti layers and approximately 193 to 357 nm for the $SiO_2$ layers. The Ti layers have an extinction coefficient of approximately 2.3. The IR absorbing layers are formed directly on an Al substrate. The dimensions of the substrate are much thicker than the thin film layers. The substrate may be formed of other materials if desired, and the layers may be varied in material to provide suitable thermal expansion characteristics, as well as IR absorbing characteristics. In one embodiment, the substrate provides a heat sink function to handle heat generated from the IR.

FIG. 3 is a table identifying alternative layers of the cold-light reflector of FIG. 1 according to an example embodiment. Part 130 in this embodiment is formed of twenty-five alternating layers of $TiO_2$ and $SiO_2$. The refractive index of the $TiO_2$ is approximate 2.5, and that of the $SiO_2$ is approximately 1.5. The $TiO_2$ also has an extinction coefficient of 0.00002. Thicknesses may be varied significantly from those in the previous example of FIG. 2. Part 120 in this embodiment is formed of nine layers of Ni (refractive index of approximately 1.7) and $SiO_2$ (refractive index of approximately 1.5. The thicknesses of the Ni layers vary from approximately 3 to 30 nm, and the thickness of the $SiO_2$ layers vary from approximately 716 to 452 nm. The Ni layers also have an extinction coefficient of approximately 3.02. An aluminum substrate is again used, with an extinction coefficient of approximately 6.2 and refractive index of approximately 0.8.

FIG. 4 is a table identifying further alternative layers of the cold-light reflector of FIG. 1 according to an example embodiment. In this embodiment, alternating layers of $TiO_2$ and $SiO_2$ are again used for part 130. The $TiO_2$ layers vary in thickness between approximately 45 and 383 nm at the interface to the layers of part 120. The $TiO_2$ layers have a refractive index of approximately 2.5 and an extinction coefficient of approximately 0.00002. The $SiO_2$ layers vary in thickness between approximately 78 to 132 nm and have a refractive index of approximately 1.5 and an extinction coefficient of approximately 0.

Part 120 in this embodiment is comprised of ten alternating layers of W and $Cr_2O_3$. The W layers vary in thickness from approximately 10 to 18 nm and have an index of approximately 3.4 and extinction coefficient of approximately 0.07. The $Cr_2O_3$ layers are approximately 382 nm thick with a refractive index of approximately 2.2 and an extinction coefficient of approximately 2.7. The layers of part 120 are formed directly on an aluminum substrate having a refractive index of approximately 0.8 and an extinction coefficient of approximately 6.2.

Figure 5:
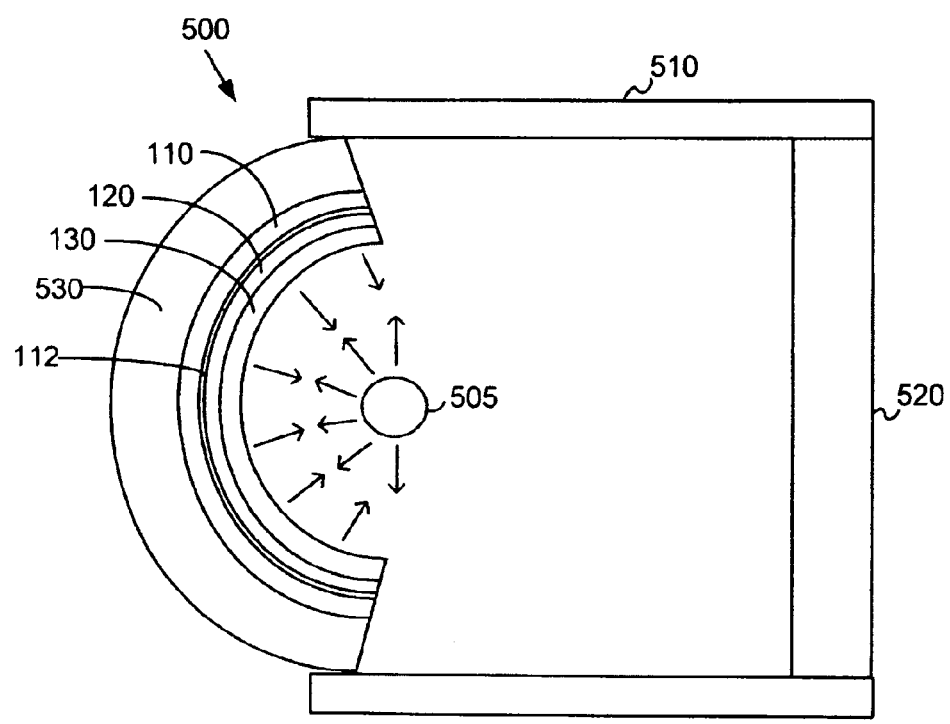
FIG. 5 is a block schematic diagram of a cold-light reflector of FIG. 1 used to project beams of bandpass filtered light according to an example embodiment.

FIG. 5 is a block schematic diagram of a light beam projector 500 used to project beams of bandpass filtered light according to an example embodiment. The cold-light IR absorbing reflector in this embodiment is concaved-shaped such as in a parabola or in an elliptical form to provide for reflection of visible light from a light source 505 toward a lens 520, which may be supported by a frame 510 coupling the reflector to the lens. Lens 520 can also be a glass or semi-metal window to hold the gas of a light source. Lens 520 may be designed to focus the light in a desired direction, or may simply pass the light through. In one embodiment, the reflector is coupled directly to the lens 520 without the need for frame 510. In a further embodiment, heat resulting from absorption of IR may be dissipated by an integral heat removal layer or device 530, thermally coupled to the IR absorption layer, part 120, such as through substrate 110. In various embodiments, device 530 may be a heat sink or heat pipe system. In further embodiments, device 530 may be the same layer as the substrate, formed thick enough to accomplish desired heat transfer characteristics.

The invention claimed is:

1. A method of using multiple layers of QWT (quarter wave thickness) thin films to form an IR (infrared) absorbing reflector, the method comprising the steps of:
   illuminating UV (ultraviolet), visible, and IR light on the IR absorbing reflector;
   reflecting greater than 95% of the visible light with a first set of QWT thin films having large differential indices of refraction;
   transmitting the IR light to a second set of QWT thin-films films having small differential indices of refraction that absorb particular wavelengths of IR light to obtain an overall absorption of IR light that is substantially uniform from a near IR region to a far IR region;
   absorbing the UV light in at least one of the first set of QWT thin-films, the second set of QWT thin-films, or an adhesion layer; and
   transmitting the absorbed IR light and UV light to a metallic substrate supporting the adhesion layer and first and second sets of QWT thin-films.

2. An IR (infrared) absorbing reflector, comprising:
   a metallic substrate;
   a first set of QWT (quarter wave thickness) thin-films having small differential indices of refraction to minimize reflectance of IR light disposed on the metallic substrate and wherein the first set of QWT thin-films absorbs particular wavelengths of IR light to obtain a substantially uniform IR light absorption from a near IR region to a far IR region; and a second set of QWT thin-films having large differential indices of refraction disposed on the first set of QWT thin-films to maximize reflection of visible light and to minimize reflection of non-visible light.

3. The IR absorbing reflector of claim 2 wherein the first set of QWT thin-films comprise alternating layers of Ti and $SiO_2$, and the second set of QWT thin-films comprise alternating layers of $TiO_2$ and $SiO_2$.

4. The IR absorbing reflector of claim 3 wherein the Ti and $SiO_2$ layers of the first set of QWT thin-films have refractive indices of approximately 1.7 and 1.5 respectively, and the alternating layers of $TiO_2$ and $SiO_2$ of the second set of QWT thin-films have refractive indices of approximately 2.5 and 1.5 respectively at a reference wavelength of 510 nm.

5. The IR absorbing reflector of claim 3 wherein the first set of QWT thin-films comprise four layers of Ti and four layers of $SiO_2$, and the second set of QWT thin-films comprise thirteen layers of $TiO_2$ and twelve layers of $SiO_2$.

6. The IR absorbing reflector of claim 3 wherein the first and second sets of QWT thin-films have a combined thickness of approximately 3200 nm.

7. The IR absorbing reflector of claim 2 wherein the first set of QWT thin-films comprise alternating layers of Ni and $SiO_2$, and the second set of QWT thin-films comprise alternating layers of $TiO_2$ and $SiO_2$.

8. The IR absorbing reflector of claim 7 wherein the Ni and $SiO_2$ layers of the first set of QWT thin-films have refractive indices of approximately 1.7 and 1.5 respectively, and the alternating layers of $TiO_2$ and $SiO_2$ of the second set of QWT thin-films have refractive indices of approximately 2.5 and 1.5 respectively at a reference wavelength of 510 nm.

9. The IR absorbing reflector of claim 7 wherein the first set of QWT thin-films comprise five layers of Ni and four layers of $SiO_2$, and the second set of QWT thin-films comprise thirteen layers of $TiO_2$ and twelve layers of $SiO_2$.

10. The IR absorbing reflector of claim 7 wherein the first and second sets of QWT thin-films have a combined thickness of approximately 4100 nm.

* * * * *